(12) United States Patent
Steffan et al.

(10) Patent No.: US 11,283,487 B2
(45) Date of Patent: Mar. 22, 2022

(54) POWER SUPPLY CIRCUIT THAT SOURCES ENERGY FROM AN NFC ANTENNA

(71) Applicant: Infineon Technologies AG, Neubiberg (DE)

(72) Inventors: Christoph Steffan, Graz (AT); Gerald Holweg, Graz (AT); David Lugitsch, Graz (AT); Johannes Schweighofer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/929,381

(22) Filed: Jul. 15, 2020

(65) Prior Publication Data

US 2021/0036740 A1 Feb. 4, 2021

(30) Foreign Application Priority Data

Jul. 30, 2019 (EP) .................................... 19188995

(51) Int. Cl.
*H04B 5/00* (2006.01)
*H02M 3/155* (2006.01)
*H02J 50/10* (2016.01)
*H01Q 7/00* (2006.01)
*H02M 7/06* (2006.01)

(52) U.S. Cl.
CPC ............. *H04B 5/0081* (2013.01); *H01Q 7/00* (2013.01); *H02M 3/155* (2013.01); *H02M 7/06* (2013.01); *H04B 5/0037* (2013.01)

(58) Field of Classification Search
CPC ...... H04B 5/00; H04B 5/0037; H04B 5/0062; H04B 5/0075; H04B 5/0081; H04B 5/0093; H04B 5/02; H04B 1/40; H02M 1/08; H02M 1/4233; H02M 3/155; H02M 3/3376; H02M 7/06; H02M 7/217; H02J 7/025; H02J 50/10; H02J 50/12; H02J 50/20; H02J 50/80; H01Q 7/00
See application file for complete search history.

(56) References Cited

U.S. PATENT DOCUMENTS 5,570,004 A 10/1996 Shibata
9,124,121 B2 * 9/2015 Ben-Shalom ........ H04B 5/0025
9,343,950 B2 * 5/2016 Kayama .................. H02M 1/32
(Continued)

OTHER PUBLICATIONS

European Search Report, EP 19188995.5, dated Jan. 17, 2020, pp. 7.

*Primary Examiner* — Quochien B Vuong
(74) *Attorney, Agent, or Firm* — Armis IP Law, LLC

(57) ABSTRACT

A power supply circuit is described herein which is capable of sourcing energy from an NFC antenna. In one embodiment, the circuit comprises a rectifier circuit configured to be coupled to an NFC antenna for receiving an antenna voltage, a filter coupled to an output of the rectifier circuit and configured to provide the rectified and smoothed antenna voltage as supply voltage, and a current limiting device coupled between the filter and an output node and configured to limit an output current provided at the output node dependent on a control signal. Further, the power supply circuit comprises a control circuit configured to receive the supply voltage and a reference voltage and to generate the control signal dependent on a difference between the reference voltage and the supply voltage.

28 Claims, 5 Drawing Sheets

(56) References Cited

U.S. PATENT DOCUMENTS

| | | | | |
|---|---|---|---|---|
| 9,853,505 B2* | 12/2017 | Liu | .................. | H02J 50/12 |
| 10,116,172 B2* | 10/2018 | Fischer | .................. | H02J 7/04 |
| 10,686,326 B2* | 6/2020 | Lee | .................. | H02J 50/70 |
| 10,826,333 B2* | 11/2020 | Chen | .................. | H02J 7/345 |
| 2009/0264163 A1 | 10/2009 | Watanabe et al. | | |
| 2014/0145504 A1 | 5/2014 | Kayama | | |
| 2019/0089197 A1* | 3/2019 | Mao | .................. | H02J 7/025 |
| 2019/0165691 A1 | 5/2019 | Telefus et al. | | |

\* cited by examiner

POWER SUPPLY CIRCUIT THAT SOURCES ENERGY FROM AN NFC ANTENNA

RELATED APPLICATION

This application claims priority to earlier filed European patent application serial number EP19188995 entitled "POWER SUPPLY CIRCUIT THAT SOURCES ENERGY FROM AN NFC ANTENNA," filed on Jul. 30, 2019, the entire teachings of which are incorporated herein by this reference.

TECHNICAL FIELD

The following disclosure relates to the field of power supplies and Near Field Communication (NFC) and particularly to circuits and devices used in connection with Near Field Communication (NFC).

BACKGROUND

Near Field Communication (NFC) denotes a standardized data transmission technique for the contactless exchange of data across relatively short distances (e.g. a few centimeters) using electromagnetically coupled inductors. NFC is based on the well-known RFID technique and allows data rates of several hundred kBits/s. Currently, NFC is mainly used in the field of "Micropayment" (non-cash payment of small amounts) as well as in the field of access control. Further applications include, for example, the transmission of authentication data in the process of establishing a communication link via, for example, Bluetooth, Wireless LAN or the like. Recently, sensor applications have been developed which allow retrieving measured data, e.g. by a mobile device, using NFC. NFC is standardized in ISO/IEC 18092 (Near Field Communication Interface and Protocol-1) and ISO/IEC 21481 (Near Field Communication Interface and Protocol-2).

With regard to the mentioned payment function many mobile devices such as smart phones are equipped with NFC transceivers (NFC Reader/Writer). Such devices are usually referred to as NFC enabled devices. An NFC chip—often referred to as NFC tag or NFC transponder—usually does not have its own energy supply and sources the electrical energy required for its operation from the electromagnetic field used for NFC (NFC field). The NFC field is usually generated by the NFC enabled device (e.g. a smart phone). That is, energy is transferred via the NFC field from the NFC enabled device to an NFC chip/transponder, whereas data transmission is possible in both directions. Many NFC enabled devices are not capable of controlling the power of the NFC field and operate with a preset transmission power which may depend on the type and the manufacturer of an NFC enabled device.

The antennas of NFC enabled devices and NFC chips/transponders are usually simple conductor loops which may be formed, e.g., on a printed circuit board (PCB). In antenna circuits such conductor loops represent respective inductors which form, in connection with corresponding capacitors, resonant circuits. For an efficient energy transfer from an NFC enabled device to an NFC transponder the corresponding antenna circuits are usually operated at the same resonance frequency, which results in the electromagnetic coupling being at its maximum. As a consequence, the voltage induced in the antenna of the NFC transponder is at its maximum. For standard applications the resonance frequency is usually at 13.56 MHz.

If the inductive coupling between the antenna of an NFC enabled device and the corresponding antenna of an NFC transponder (e.g. when the NFC transponder is placed very closely to the NFC enabled device) is good, situations can occur in which more energy is transferred to the NFC transponder than required by the NFC transponder for its normal operation. In these situations the surplus energy needs to be dissipated in the NFC transponder, for example in a shunt transistor.

SUMMARY

In some applications it might be desirable to not dissipate the surplus energy in the NFC transponder as the energy could be used for purposes other than data transmission.

A power supply circuit is described herein which is capable of sourcing energy from an NFC antenna. In one embodiment, the circuit comprises a rectifier circuit configured to be coupled to an NFC antenna for receiving an antenna voltage, a filter coupled to an output of the rectifier circuit and configured to provide the rectified and smoothed (filtered) antenna voltage as supply voltage, and a current limiting device coupled between the filter and an output node and configured to limit an output current provided at the output node dependent on a control signal. Further, the power supply circuit comprises a control circuit configured to receive the supply voltage and a reference voltage and to generate the control signal dependent on a difference between the reference voltage and the supply voltage.

Furthermore, a circuit arrangement is described herein that, in accordance with one embodiment, includes an NFC antenna and an NFC circuit connected to the NFC antenna, wherein the NFC circuit includes a supply circuit configured to generate a DC supply voltage for the NFC circuit. The circuit arrangement further includes one or more of the mentioned above power supply circuits for supplying further circuitry.

Further embodiments herein include a circuit comprising: an NFC (Near Field Communication) antenna; an NFC circuit connected to the NFC antenna, the NFC circuit including a supply circuit operative to generate a DC supply voltage for the NFC circuit; and supplemental power supply circuitry coupled to the NFC antenna, the supplemental power converter circuitry including: a rectifier circuit coupled to an NFC antenna for receiving an antenna voltage; a filter coupled to an output of the rectifier circuit, the filter operative to provide a rectified and filtered antenna voltage as a supply voltage; a current limiting device coupled between the filter and an output node, the current limiting device operative to limit an output current provided at the output node dependent on a control signal; and a control circuit operative to receive the supply voltage and a reference voltage and to generate the control signal dependent on a difference between the reference voltage and the supply voltage.

In one embodiment, the current limiting device has a controllable resistance which depends on the control signal; the control circuit is operative to generate the control signal such that the supply voltage does not fall below the reference voltage.

In still further example embodiments, wherein the current limiting device includes a transistor.

In yet further example embodiments, the control circuit includes a difference amplifier operative to amplify a signal representing the difference between the reference voltage and the supply voltage.

If desired, the rectifier circuit includes a bridge rectifier and the filter includes a capacitor.

In one embodiment, the reference voltage is controlled in accordance with a configuration signal.

Circuitry as discussed herein can be configured in any suitable manner, in one embodiment, the NFC circuit is an integrated circuit arranged in a first chip; and the supplemental power supply circuitry is an integrated circuit disposed in a second chip. The first chip, the second chip, and the NFC antenna are optionally disposed on the same circuit board.

Further embodiments herein include a method comprising: generating a supply voltage by rectifying and filtering an antenna voltage received from an NFC antenna to supply power to a load, and via the supply voltage, providing an output current to the load; and controlling the output current provided by the supply voltage depending on a difference between a reference voltage and the supply voltage.

One method embodiment as described herein includes generating the reference voltage by an NFC circuit that is coupled to the NFC antenna.

Further embodiments herein include limiting the output current provided to the load based on a control signal. The control signal is produced based on the difference between the reference voltage and the supply voltage.

Still further embodiments herein controlling the output current based upon a respective control signal applied to a current limiter that provides conductivity between the supply voltage and the load.

In one embodiment, controlling the output current includes applying the control signal to a respective switch.

Yet further example embodiments herein include deriving a control signal based upon a magnitude of the supply voltage.

Controlling the output current optionally includes applying the control signal to a respective switch controlling conveyance of the supply voltage to the load.

Moreover, a method for providing a supply voltage is described herein. In accordance with one embodiment, the method includes generating the supply voltage by rectifying and smoothing an antenna voltage received from an NFC antenna, and providing a respective output current to a load. Further, the method includes controlling the output current dependent on a difference between a reference voltage and the supply voltage.

DETAILED DESCRIPTION

In the following detailed description, reference is made to the accompanying drawings. The drawings form a part of the description and, for the purpose of illustration, show examples of how the invention may be used and implemented. It is to be understood that the features of the various embodiments described herein may be combined with each other, unless specifically noted otherwise.

FIG. 1 illustrates the coupling of an NFC chip/transponder to an NFC enabled device such as a smart phone or the like.

DETAILED DESCRIPTION

Figure 1:
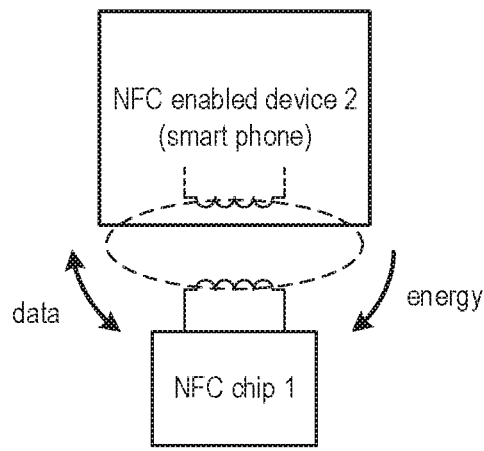

As mentioned above, Near Field Communication (NFC) is a standardized technique for energy and data transmission between an NFC enabled device 2 such as, for example, a tablet computer, a smart phone or any other mobile device, and an NFC chip 1, which may function as NFC transponder, RFID tag or simply as an NFC communication interface that allows further circuits (e.g. a sensor circuit) to communicate with the NFC enabled device 2. This situation is illustrated in FIG. 1. Usually, NFC is not only used for (e.g. bidirectional) data transmission but also for the (unidirectional) transmission of energy from the NFC enabled device 2 to the NFC chip 1. The antennas of the NFC chip 1 and the NFC enabled device 2 are usually implemented using conductor loops (i.e. flat coils), and data transmission, as well as energy transmission, are based on the inductive coupling of the two antennas.

NFC chips may be employed in various applications. Today, NFC is mainly used for authentication, for example, in payment systems or access control systems. Recently, NFC has also begun to be used in sensor applications to provide a communication link between sensor electronics (e.g. included in the NFC chip 1) and an NFC enabled device, which may then be used for the digital post processing and to display the measured data provided by the sensor electronics on a screen of the NFC enabled device 2. Additionally or alternatively, the NFC enabled device 2 may form a "bridge" between the sensor electronics and a host computer connected to the NFC enabled device 2 via, e.g., a local area network or the internet. Furthermore, the NFC enabled device 2 may be used as an input device for the sensor electronics. Accordingly, NFC allows the NFC enabled device to act as human-machine interface of the sensor application.

Figure 2:
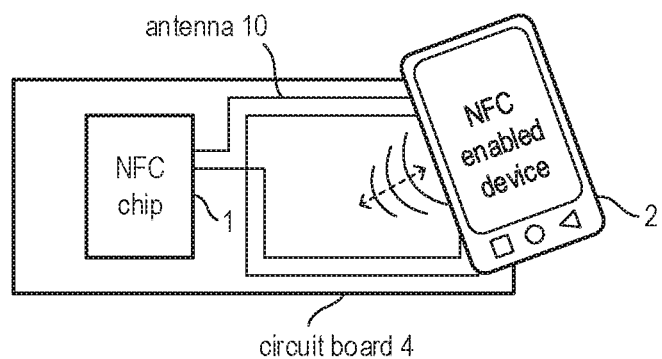
FIG. 2 illustrates one generic NFC application in which an NFC chip and an NFC antenna are arranged on a printed circuit board.

FIG. 2 illustrates one example of an NFC chip 1 arranged on a circuit board. As mentioned the NFC chip 1 may include sensor electronics. Alternatively, the NFC chip 1 may be a simple RFID tag or include any other kind of application specific circuitry. As shown in FIG. 2, the antenna 10 is formed by a conductor loop arranged on a printed circuit board 4 which also carries the NFC chip 1. In order to establish an NFC link, the NFC enabled device 2 must be placed sufficiently close to the antenna 10 of the NFC chip 1 to ensure a sufficient electromagnetic coupling, which is necessary for supplying the NFC chip with energy.

Figure 3:
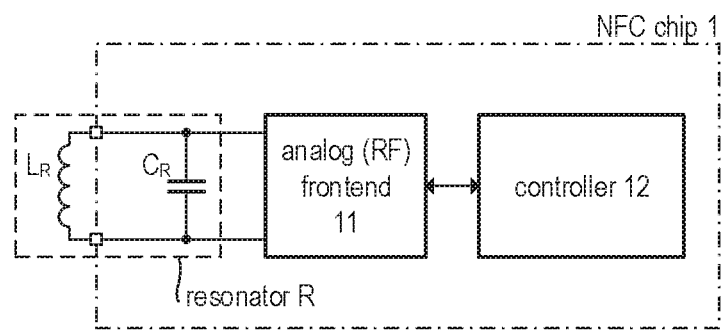
FIG. 3 illustrates a general example of an NFC chip coupled to an NFC antenna.

FIG. 3 illustrates one simple example of how an NFC chip 1 may be implemented. Accordingly, the NFC chip 1 includes a capacitor CR which, together with the inductance $L_R$ of the antenna 10, forms a parallel resonant circuit R. The parallel resonant circuit R is connected to the analog frontend 11 (AFE), which basically includes the radio frequency (RF) frontend (receive and transmit channel) as well as a rectifier circuit and a voltage regulation circuit. More details will be discussed later with reference to FIG. 5. The analog frontend 11 is coupled with a digital circuit that is referred to as controller 12 in the present example. The controller 12 is configured to receive and transmit data in accordance with the applicable data transmission protocol and to process the received information. The controller 12 may also include a memory that includes stored information, which may be used to process the received data and to generate data that is sent back to the NFC enabled device. For example, NFC chips for use in access control systems may include a memory for storing a secret digital key which allows to identify a person carrying the NFC chip. It is understood that the NFC chip 1 shown in FIG. 3 may include various further circuits and components, depending on its actual purpose and application.

While the NFC chip 1 is supplied with energy from the electromagnetic field (NFC field) generated by the NFC enabled device 2, most NFC enabled devices do not allow to control the transmitted power (energy per time). Referring again to FIG. 2, the electrical power received at the NFC chip 1 that is not needed for the operation of the circuitry included in the NFC chip is usually dissipated and thus converted into heat. While surplus energy is dissipated in the NFC chip 1, further circuits arranged on the circuit board 4 (and not included in NFC chip 1) may, nevertheless, need a power supply such as, for example, a coin cell battery mounted on the circuit board 4 or an AC/DC adapter connected to the circuit board 4 via a cable.

Figure 4:
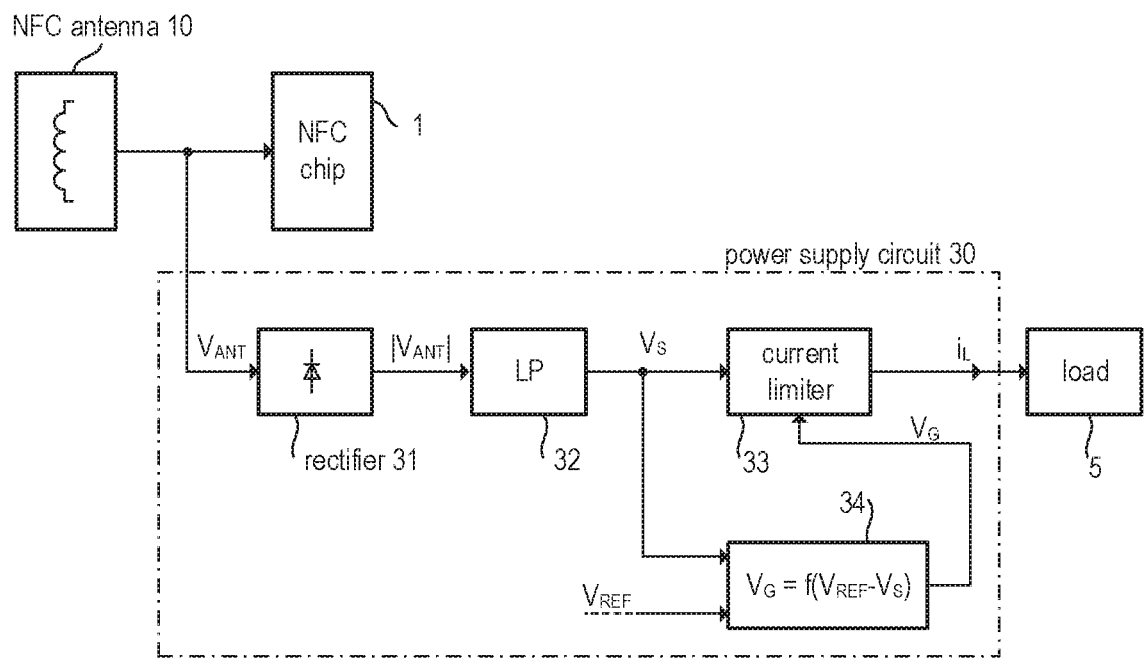
FIG. 4 illustrates one example of an NFC chip coupled to an NFC antenna and a supplemental power supply circuit that sources its energy from the NFC antenna.

FIG. 4 is block diagram illustrating an NFC chip 1 coupled to an NFC antenna 10, wherein a supplemental power supply circuit 30 is coupled to an NFC antenna 10 and configured to operate as power supply for a load 5. The power supply circuit 30 sources energy from the NFC antenna 10 without interfering with the operation of the NFC chip 1. Accordingly, the power supply circuit 30 is configured to ensure that the power (energy per time) sourced from the NFC antenna 10 is not greater than the unneeded surplus power of the NFC chip 1 (which would be dissipated if the power supply circuit 30 were not present). It is noted that the NFC chip 1 includes another power supply circuit that sources its energy from the NFC antenna 10 and supplies the circuitry included in the NFC chip 1.

According to FIG. 4, the power supply circuit 30 includes a rectifier circuit coupled to the NFC antenna 10 and configured to rectify the voltage $V_{ANT}$ induced in the antenna as a result of the NFC field provided by an NFC enabled device (not shown in FIG. 4). The rectified antenna voltage, which is denoted as $|V_{ANT}|$ in FIG. 4, is smoothed (filtered) by a filter 32, which may be a low-pass filter. The filter 32 may, in essence, be implemented with a capacitor coupled to the output of the rectifier circuit 31. The rectified and smoothed voltage provided at the output of the filter 32 is denoted as $V_S$.

As mentioned, in order to prevent the power supply circuit 30 from interfering with the operation of the NFC chip 1, the power sourced from the NFC antenna 10 by the power supply circuit 30 should not exceed the unneeded surplus power of the NFC chip. Therefore, the power supply circuit 30 includes a current limiting device 33, which may be, e.g. a simple transistor coupled between the filter 32 (which provides the voltage $V_S$) and an output of the power supply circuit 30 (to which a load 5 can be connected). The current limiting device 33 is controlled such that the output current $i_L$ supplied to the load 5 remains low enough to prevent the voltage $V_S$ from dropping below a threshold voltage $V_{REF}$. If the power supply circuit 30 allowed the load 5 to draw higher load currents, the NFC antenna 10 would become overloaded.

The NFC antenna 10 becoming overloaded means that—due to the load current $i_L$ being too high—the antenna voltage $V_{ANT}$ (and thus also the rectified and smoothed antenna voltage $V_S$) drops to a level that is too low for a reliable operation of the NFC chip 1. The mentioned reference voltage $V_{REF}$ represents a lower limit of the voltage $V_S$. That is, when the voltage $V_S$ (the rectified and smoothed antenna voltage) drops to or below the threshold voltage $V_{REF}$ then the load current $i_L$ supplied to the load 5 by the power supply circuit 30 must be reduced to a safe level, e.g. to a level at which the condition $V_S > V_{REF}$ is fulfilled. For this purpose, the power supply circuit includes a control circuit 34 which is coupled to the output of the filter 32 to receive the voltage $V_S$. The control circuit 34 further receives the threshold voltage $V_{REF}$ and generates an output signal $V_G$, which can generally be regarded as a function of the difference $V_{REF} - V_S$. As discussed above, when the difference $V_{REF} - V_S$ becomes positive (indicating that the condition $V_S > V_{REF}$ is not fulfilled), then the control circuit 34 produces an output signal $V_G$ that causes the current limiting device 33 to reduce the load current $i_L$. In one example, the load current $i_L$ is regulated such that the condition $V_S = V_{REF}$ is approximately fulfilled. The threshold voltage $V_{REF}$ is chosen dependent on the specifications of the NFC chip 1. In essence, the threshold voltage $V_{REF}$ represents the minimum voltage needed by the NFC chip 1, and the control circuit 34 together with the current limiting device 33 ensures that the antenna will not be overloaded and can provide enough power to the NFC chip 1 for the supply circuit included in the NFC chip (not shown in FIG. 4) to be able to generate a sufficiently high voltage for the operation of the NFC chip 1.

Figure 5:
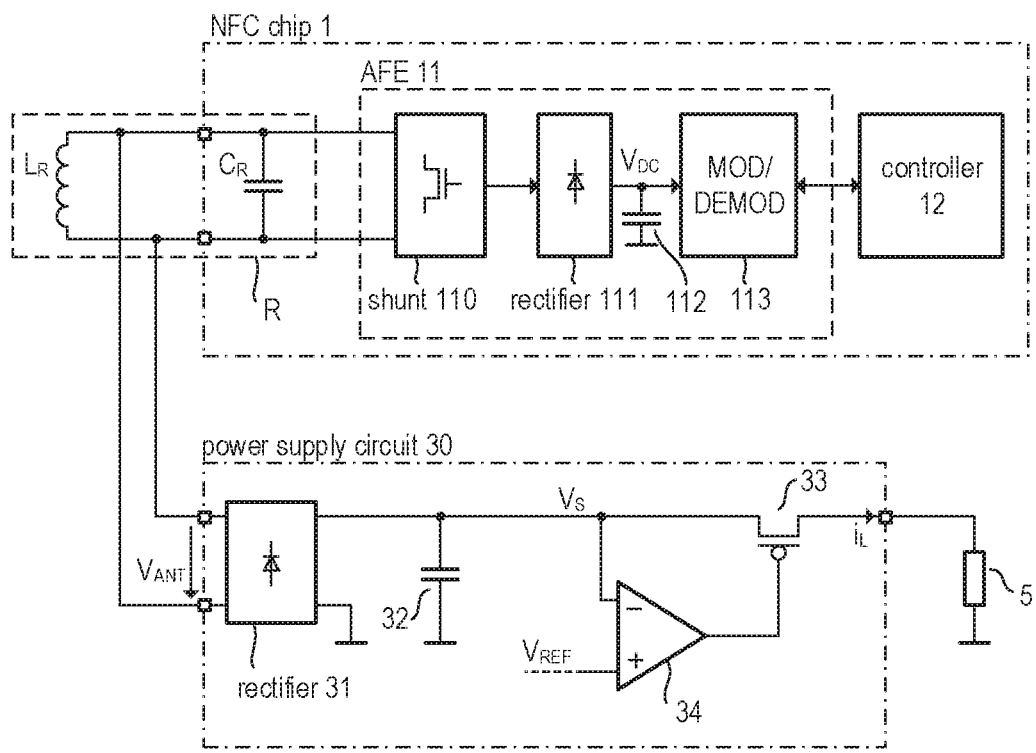
FIG. 5 illustrates one exemplary implementation of the power supply circuit of FIG. 4.

FIG. 5 illustrates one exemplary implementation of the power supply circuit 30 in more detail. Accordingly, the filter 32 for smoothing the rectified antenna voltage provided at the output of the rectifier circuit 31 is a capacitor 32. The rectifier 31 may be a normal bridge rectifier composed of four diodes. The capacitance of the capacitor 32 may be in the range of a few microfarads, e.g. 10 μF. The current limiting device 33 may be a variable resistance, which may be implemented using a transistor. In the current example, the current limiting device 33 is implemented as p-channel MOS transistor. The control circuit 34, which provides the control signal $V_G$ (gate voltage) for the MOS transistor 33, may be implemented using a difference amplifier, e.g. an operational amplifier, which receives the voltage $V_S$ at a first (inverting) input and the threshold voltage $V_{REF}$ at a second (non-inverting) input. When the difference $V_{REF} - V_S$ becomes (slightly) positive, the output voltage $V_G$ of the operational amplifier 34 will also be positive and (due to the high gain of the operational amplifier) will be high enough to control the conductance of the MOS transistor such that the difference $V_{REF} - V_S$ is reduced to approximately zero. As long as the difference $V_{REF} - V_S$ is negative, the output voltage of the operational amplifier will be at a low level and the MOS transistor 33 will be fully switched on.

FIG. 5 also illustrates one example of the analog frontend 11 included in the NFC chip 1. Accordingly, the analog frontend 11 of the NFC chip 1 includes a power supply circuit similar to the power supply circuit 30. Accordingly, the analog frontend includes a rectifier circuit 111 and a capacitor 112 for smoothing the rectifier output voltage. The smoothed rectifier output voltage is denoted as $V_{DC}$. The analog frontend 11 further includes a modulator/demodulator circuit that operates in accordance with the NFC standard to receive and transmit data.

The analog frontend 11 further includes a controllable shunt 110, which can be regarded as a voltage regulator that provides a current path connected in parallel to the antenna and bypassing the power supply circuit (rectifier circuit 111, capacitor 112). The shunt 110 is configured to load the NFC antenna 10 such that the antenna voltage does not exceed a desired amplitude. When, for example, the antenna voltage $V_{ANT}$ has an amplitude of 1 volt, but only 0.5 volts are needed to operate the NFC chip, then the shunt 110 will draw as much current from the antenna as is needed for the amplitude to drop to 0.5 volts, whereby the electrical surplus power is dissipated in the shunt 110 in the form of heat. The power supply circuit 30 that sources power from the NFC antenna 10 has the effect that less surplus power has to be dissipated in the shunt 110, and the control unit 34 (in connection with the current limiting device 33) ensures that the power supply circuit 30 does not overload the antenna 30 and that the antenna can provide enough power to the NFC chip 1 for it to operate.

Figure 6:
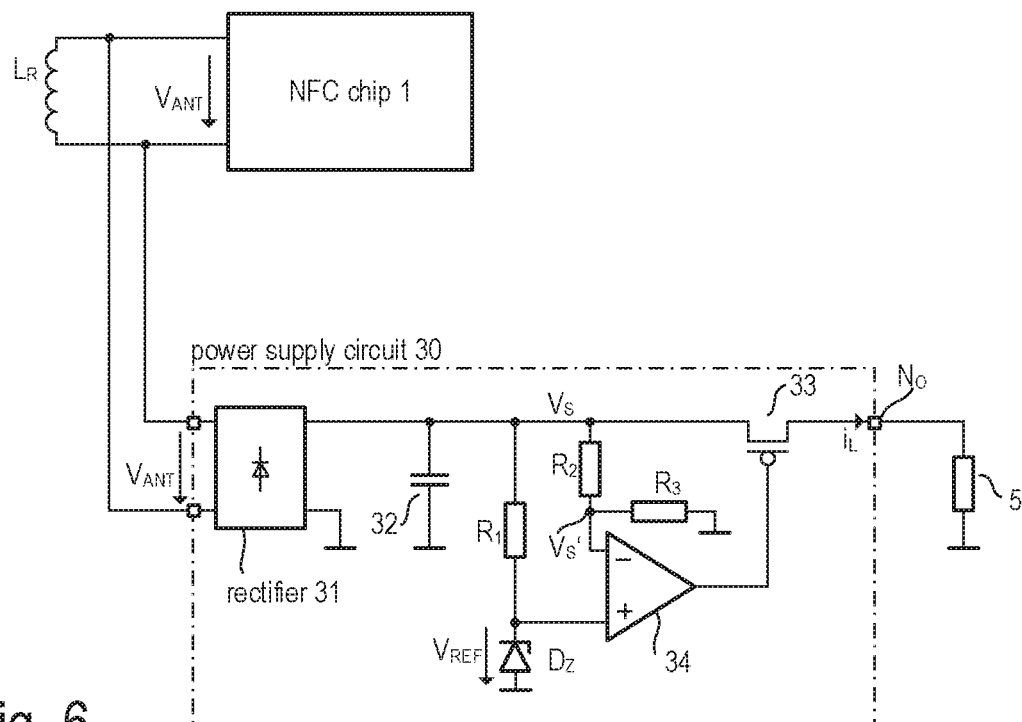
FIGS. 6-8 illustrate further examples of how the power supply circuits of FIGS. 4 and 5 can be used.
Figure 7:
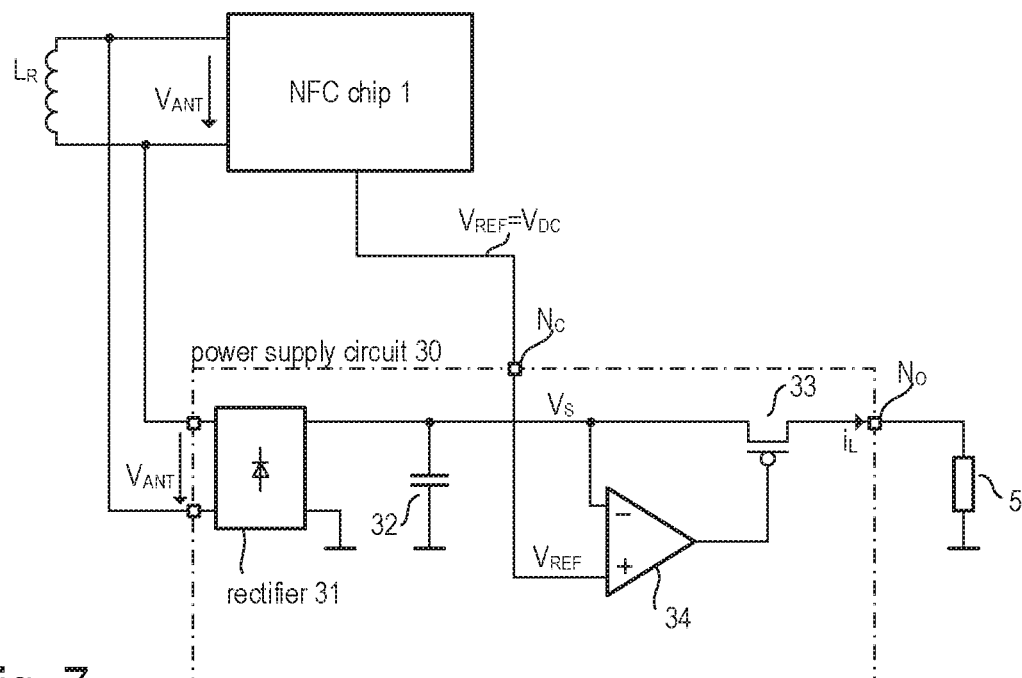

FIGS. 6 and 7 illustrate two exemplary applications of the supplemental power supply circuit discussed above. FIG. 6 illustrates one example of a circuit arrangement including an NFC antenna 10 and an integrated NFC circuit 1 (NFC chip) connected to the NFC antenna 10. The NFC circuit 1 includes a supply circuit (see, e.g., FIG. 6, reference numerals 110, 111, 112) configured to generate a DC supply voltage $V_{DC}$ for operating the NFC circuit 1. The circuit arrangement of FIG. 6 further includes a supplemental power supply circuit 30 which is also coupled to the NFC antenna 10 and may be implemented as illustrated in FIGS. 4 and 5. Accordingly, the supplemental power supply circuit 30 includes the rectifier circuit 31 which receives the voltage $V_{ANT}$ from the antenna and provides a respective rectified voltage. A filter 32 (e.g. a capacitor) is coupled to an output of the rectifier circuit 31 and is configured to provide a supply voltage $V_S$, which is the smoothed rectified antenna voltage. The supplemental power supply circuit 30 further includes a current limiting device 33 (e.g. a MOS transistor) that is coupled between the filter 32 and an output node $N_O$ and configured to limit an output current $i_L$ provided at the output node $N_O$ dependent on a control signal $V_G$. A control circuit 34 (which may include a difference amplifier) is configured to receive the scaled supply voltage $V_S'$ and a reference voltage $V_{REF}$ and to generate the control signal $V_G$ dependent on the difference $V_{REF} - V_S' = V_{REF} - V_S \cdot R_3/(R_2+R_3)$. In the depicted example, the reference voltage $V_{REF}$ is generated using a series circuit of a Zener diode $D_Z$ and a resistor $R_1$ coupled between the supply voltage $V_S$ and ground potential GND, wherein the voltage drop across the Zener diode is used as reference voltage $V_{REF}$. In this example, the reference voltage $V_{REF}$ is substantially constant. It is understood that the Zener diode is not necessarily a dedicated diode as such. Depending on the technology used, other circuits that are substantially equivalent to a Zener diode in their function may be used instead. These equivalent circuits are also referred to as a "Zener diode". Further it is noted, that the scaled value $V_{REF} \cdot (R_2+R_3)/R_3$ may be regarded as reference voltage, when the supply voltage $V_S$ is scaled using the voltage divider $R_2$, $R_3$ as shown in FIG. 6, and the scaled supply voltage is processed in the control circuit (the voltage divider $R_2$, $R_3$ may be regarded as part of the control circuit). The difference between the reference voltage and the supply voltage is then $V_{REF} \cdot (R_2+R_3)/R_3 - V_S$. This applies to all embodiments which process the scaled supply voltage.

In the example of FIG. 6, the Zener diode $D_Z$ is designed such that voltage drop $V_{REF}$ across the Zener diode (i.e. the reference voltage), when scaled by the factor $(R_2+R_3)/R_3$ that is determined by the voltage divider composed of resistors $R_2$, $R_3$, matches the supply voltage $V_{DC}$ used by the NFC circuit 1. That is, $V_{REF} \cdot (R_2+R_3)/R_3 \approx V_{DC}$. In other words, the reference voltage $V_{REF}$ is chosen to be equal to or slightly higher than the scaled supply voltage $V_{DC} \cdot R_3/(R_2+R_3)$. Such a circuit design prevents the supplemental power supply circuit 30 from overloading the NFC antenna 10, which would cause the amplitude of the antenna voltage $V_{ANT}$ to drop too much (which would prevent the NFC circuit 1 from maintaining its internal supply voltage $V_{DC}$).

In the example of FIG. 7, the reference voltage $V_{REF}$ that is used by the supplemental NFC circuit 1 can be actively set by the NFC circuit 1. For this purpose, the NFC circuit 1 may be configured to output a signal that is indicative of internal supply voltage $V_{REF}$. In the example of FIG. 7 this signal is the supply voltage $V_{DC}$ itself. The supply circuit included in the NFC chip 1 (see, e.g., FIG. 6, reference numerals 110, 111, 112) may be configured to adjust the level of the supply voltage $V_{DC}$ dependent on the current requirements of the application and to signal the current supply voltage $V_{DC}$ to the supplemental power supply voltage 30. In this example, an overload of the NFC antenna is avoided, even when the NFC circuit 1 varies its internal supply voltage $V_{DC}$.

Figure 8:
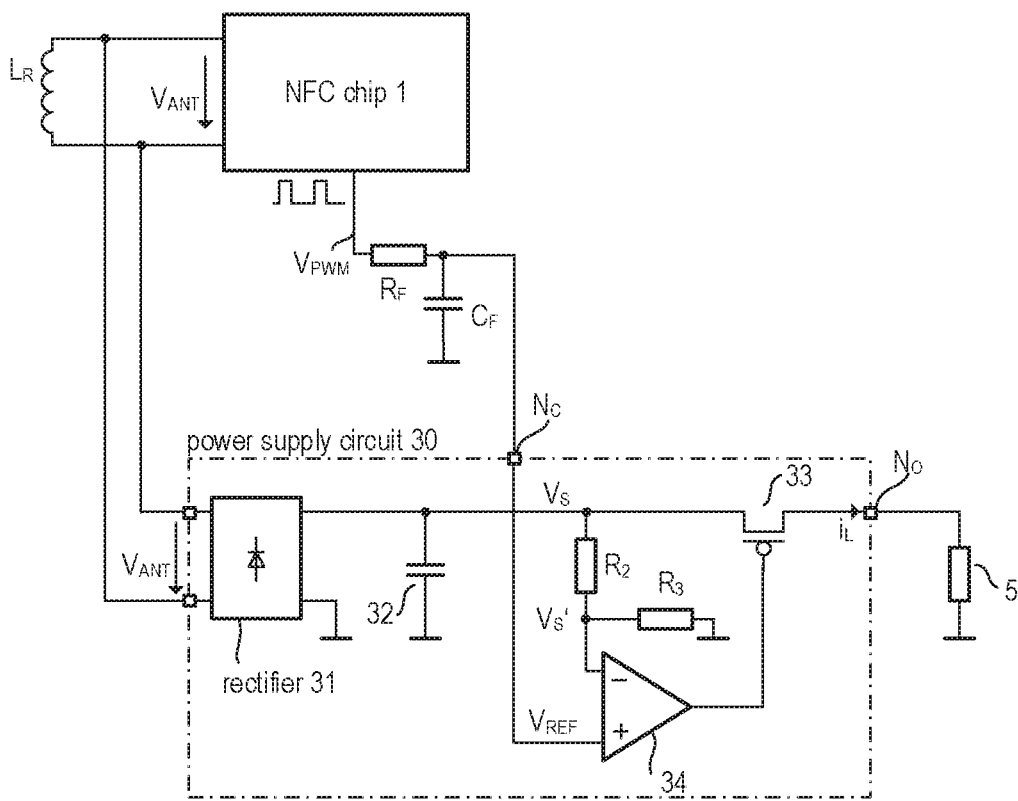

The example of FIG. 8 is basically the same as the example of FIG. 7; the signal indicative of the current supply voltage $V_{DC}$ used by the NFC circuit 1 is, however, a pulse-width modulated signal $V_{PWM}$. It is understood that any other type of modulation such as, for example, sigma-delta-modulation is also applicable. The modulated signal $V_{PWM}$ is low-pass filtered to obtain the reference voltage $V_{REF}$. In the present example, a simple RC low pass filter is used (resistor RF, capacitor CF). When adequately generated, the low-pass filtered signal equals the average level of the pulse-width modulated signal $V_{PWM}$ (in a steady state). Different from the previous example, the operational amplifier 34 receives the reference voltage and the scaled supply voltage $V_S'$. If the resistances of the resistors $R_2$, $R_3$ of the voltage divider are equal, then the scaled supply voltage $V_S'$ equals $V_S/2$. In this case, the reference voltage $V_{REF}$ provided by the NFC circuit 1 (indirectly via the low pass $R_F$, $C_F$) may be indicative of half of the internal supply voltage $V_{DC}$, and the supplemental power supply circuit 30 will limit the output current $i_L$ such that $V_S' = V_S/2$ does not drop below $V_{REF}$ (representing $V_{DC}/2$).

In the examples shown in FIGS. 6 to 8 the NFC circuit 1 is integrated in a first semiconductor chip (NFC chip) and the supplemental power supply circuit 30 is integrated in a second semiconductor chip separate from the first semiconductor chip. The first and the second semiconductor chip may both be mounted on one circuit board, and the NFC antenna 10 may also be formed on the same circuit board. The load 5 supplied by the supplemental power supply circuit 30 may also be mounted on the circuit board. It is understood that the supplemental power supply circuit 30 may also be included in the NFC chip 1, which may then provide the output current $i_L$ to the load 5 externally connected to the NFC chip 1.

Figure 9:
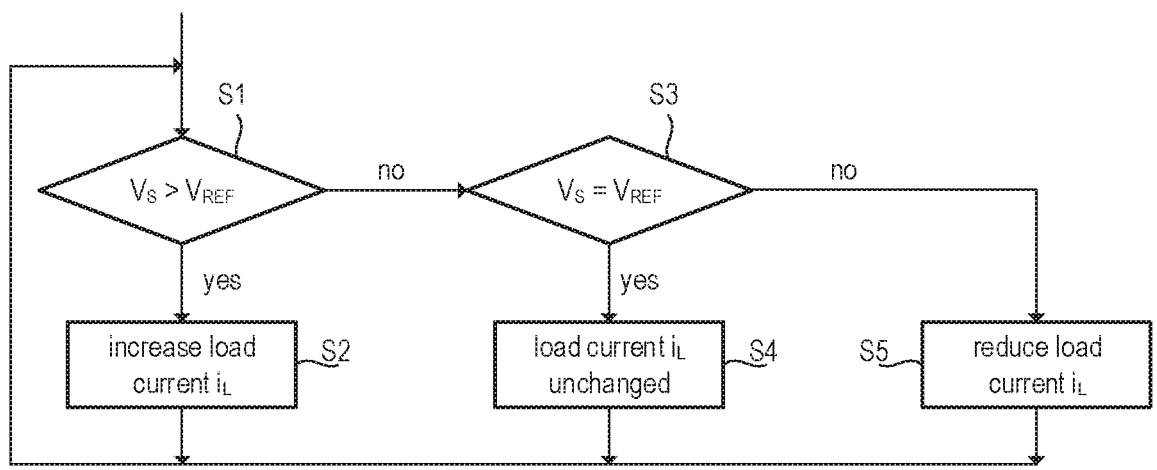
FIG. 9 is a flow chart illustrating one example of how the current limitation included in the power supply circuits of FIGS. 4 and 5 can be controlled.

FIG. 9 is a flow chart illustrating one example of a method for providing a supplemental supply voltage $V_S$ based on the voltage $V_{ANT}$ provided by an NFC antenna. In accordance with one embodiment the method includes generating the supply voltage $V_S$ by rectifying and smoothing the antenna voltage $V_{ANT}$ received from the NFC antenna 10 in order to supply a load 5, and providing a respective output current $i_L$ to the load 5 (cf. FIGS. 4 and 5). The method further includes controlling the output current $i_L$ dependent on a difference $V_{REF}-V_S$ between a reference voltage $V_{REF}$ and the supply voltage $V_S$. One example of the output current control/limitation is illustrated in more detail in FIG. 9. Accordingly, the load current $i_L$ is allowed to increase when the difference $V_{REF}-V_S$ is negative (equivalent to $V_S>V_{REF}$, see FIG. 9, Steps S1 and S2), and the load current $i_L$ is left unchanged when the difference $V_{REF}-V_S$ is zero (equivalent to $V_S=V_{REF}$, see FIG. 9, Steps S3 and S4). Otherwise, i.e. when the difference $V_{REF}-V_S$ is positive (equivalent to $V_S<V_{REF}$, see FIG. 9, Step S5), the load current $i_L$ is reduced.

It is understood that the load current control is only effective when the load 5 connected to the output node $N_O$ is capable of sinking the load current $i_L$. In other words, the load current $i_L$ does not, of course, increase when the load 5 is not able to sink a higher load current. In this case, nevertheless, the load current limit is increased to a maximum, e.g. by fully switching on the transistor 33 in the example of FIG. 6, 7 or 8. The output of the operational amplifier 34 would become saturated in this situation. Current control/limitation will, however, automatically become active when the difference $V_{REF}-V_S$ increases to or above zero volts (equivalent to $V_{REF}=V_S$ or, respectively, $V_S<V_{REF}$).

Figure 10:
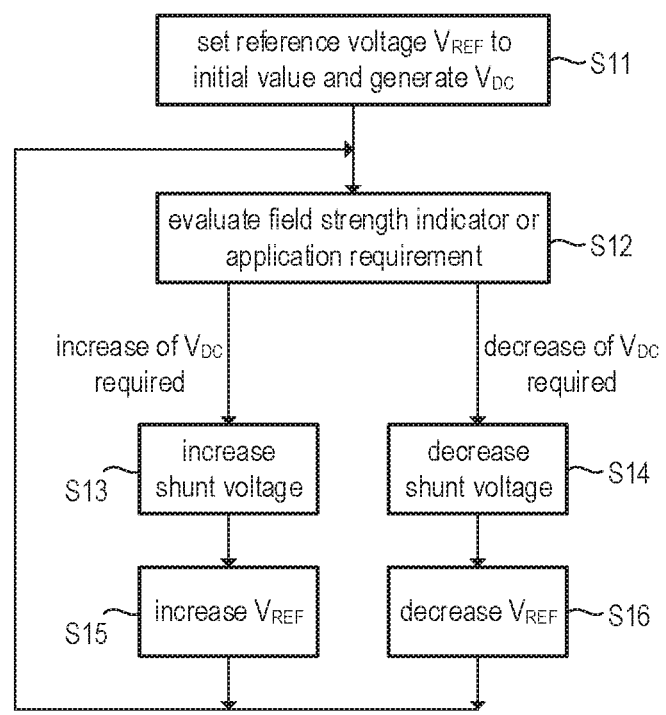
FIG. 10 is a flow chart illustrating one example of how an NFC circuit can adjust the current limitation included in the power supply circuits of FIGS. 7 and 8.

FIG. 10 is a flow chart illustrating the operation of the NFC chip 1 in the example of FIG. 7, in which the NFC chip 1 provides the reference voltage $V_{REF}$ to the supplemental power supply circuit 30. When starting up, the NFC chip generates an internal supply voltage $V_{DC}$ in accordance with a preset initial value by setting the voltage across the shunt (see, e.g., FIG. 5, shunt 110) to a suitable value. Similarly, the reference voltage $V_{REF}$ output to the power supply circuit 30 is set to a corresponding initial value (see FIG. 10, step S11). The NFC chip 1 may then monitor a field strength indicator (representing the amplitude of the antenna voltage $V_{ANT}$) or receive a request from an application which requires a higher internal supply voltage $V_{DC}$ (see FIG. 10, step S12). When the evaluation of the field strength indicator or the received request indicates an increase of the supply voltage $V_{DC}$, the voltage across the shunt 110 is increased and, consequently, the reference voltage $V_{REF}$ is increased accordingly (see FIG. 10, steps S13 and S15). Similarly, when the evaluation of the field strength indicator or the received request indicates a decrease of the supply voltage $V_{DC}$, the voltage across the shunt 110 is decreased and, consequently, the reference voltage $V_{REF}$ is decreased accordingly (see FIG. 10, steps S13 and S15).

The invention claimed is:

1. An apparatus comprising:
   an NFC (Near Field Communication) antenna operative to produce an antenna voltage;
   an NFC circuit connected to the NFC antenna, the NFC circuit including a supply circuit operative to generate, from the antenna voltage, a DC voltage to power the NFC circuit; and
   supplemental power supply circuitry coupled to the NFC antenna, the supplemental power supply circuitry including:
   a rectifier circuit coupled to the NFC antenna for receiving the antenna voltage, the rectifier circuit operative to generate a rectified voltage from the antenna voltage;
   a filter coupled to an output of the rectifier circuit, the filter operative to produce a supply voltage via filtering the rectified voltage;
   a current limiting device coupled between the filter and an output node, the current limiting device operative to limit an output current provided at the output node to a load depending on a control signal; and
   a control circuit operative to: i) receive the supply voltage and a reference voltage, and ii) generate the control signal depending on a difference between the reference voltage and the supply voltage; and
   wherein control circuit is operative to: increase a magnitude of the output current to the load in response to detecting that a magnitude of the supply voltage is greater than a magnitude of the reference voltage.

2. The apparatus of claim 1, wherein the current limiting device has a controllable resistance which depends on the control signal; and
   wherein the control circuit is operative to generate the control signal such that the supply voltage does not fall below the reference voltage.

3. The apparatus of claim 1, wherein the current limiting device includes a transistor.

4. The apparatus of claim 1, wherein the control circuit includes a difference amplifier operative to amplify a signal representing the difference between the reference voltage and the supply voltage.

5. The apparatus of claim 1, wherein the rectifier circuit includes a bridge rectifier and the filter includes a capacitor.

6. The apparatus of claim 1, wherein the reference voltage is controlled in accordance with a configuration signal.

7. The apparatus of claim 1, wherein the NFC circuit is an integrated circuit arranged in a first chip; and
   wherein the supplemental power supply circuitry is an integrated circuit disposed in a second chip.

8. The apparatus circuit of claim 7, wherein the first chip, the second chip, and the NFC antenna are disposed on a circuit board.

9. A method comprising:
   generating a supply voltage via rectifying and filtering an antenna voltage received from an NFC (Near Field Communication) antenna, the antenna voltage used to produce a DC voltage to power an NFC circuit;
   via the supply voltage, providing an output current to a load;
   controlling the output current provided by the supply voltage depending on a difference between a reference voltage and the supply voltage, control of the output current maintaining a magnitude of the DC voltage; and
   wherein controlling the output current includes: increasing a magnitude of the output current to the load in response to detecting that a magnitude of the supply voltage is greater than a magnitude of the reference voltage.

10. The method of claim 9 further comprising:
    generating the reference voltage via the NFC circuit that is coupled to the NFC antenna.

11. The method as in claim 9, wherein controlling the output current includes:
    limiting the output current provided to the load based on a control signal.

12. The method as in claim 11 further comprising:
    producing the control signal based on the difference between the reference voltage and the supply voltage.

13. The method as in claim 9 further comprising:
    controlling the output current based upon a respective control signal applied to a current limiter that provides conductivity between the supply voltage and the load.

14. The method as in claim 13, wherein controlling the output current includes applying the control signal to a respective switch.

15. The method as in claim 9, wherein controlling the output current includes deriving a control signal based upon a magnitude of the supply voltage.

16. The method as in claim 15, wherein controlling the output current includes applying the control signal to a respective switch controlling conveyance of the supply voltage to the load.

17. The method as in claim 9, wherein the reference voltage is set to a desired setting of the DC voltage.

18. The method as in claim 9, wherein controlling the output current provided by the supply voltage to the load ensures availability of sufficient power from the antenna voltage to produce the DC voltage and power the NFC circuit.

19. The method as in claim 9, wherein the magnitude of the reference voltage represents a minimum voltage of the DC voltage needed to sufficiently power the NFC circuit.

20. The method as in claim 9, wherein controlling the output current includes:
decreasing the magnitude of the output current to the load in response to detecting that the magnitude of the supply voltage is less than the magnitude of the reference voltage.

21. An apparatus comprising:
a power supply circuit operative to:
generate a supply voltage from an antenna voltage received from an NFC (Near Field Communication) antenna, the antenna voltage powering an NFC circuit coupled to the NFC antenna;
via the supply voltage, providing an output current to a load, the load being independent of the NFC circuit;
control the output current provided by the supply voltage to the load depending on a difference between a magnitude of the supply voltage and a magnitude of a reference voltage; and
wherein the power supply circuit is further operative to increase a magnitude of the output current to the load in response to detecting that the magnitude of the supply voltage is greater than the magnitude of the reference voltage.

22. The apparatus as in claim 21, wherein the power supply circuit is further operative to decrease the magnitude of the output current to the load in response to detecting that the magnitude of the supply voltage is less than the magnitude of the reference voltage.

23. The apparatus as in claim 21, wherein control of the output current provided by the supply voltage to the load depending on the difference between the magnitude of the supply voltage and the magnitude of the reference voltage is operative to ensure availability of sufficient power from the antenna voltage to power the NFC circuit.

24. The apparatus as in claim 21, wherein the magnitude of the reference voltage represents a minimum voltage needed to sufficiently power the NFC circuit.

25. The apparatus as in claim 21, wherein the NFC circuit includes a power circuit operative to convert the received antenna voltage into a DC voltage operative to power the NFC circuit; and
wherein the NFC circuit includes a controller operative to control the magnitude of the reference voltage, the magnitude of the reference voltage indicating a desired magnitude of the DC voltage for powering the NFC circuit.

26. The apparatus as in claim 21, wherein the output current provided by the supply voltage to the load represents excess power available from the antenna voltage that is not needed to power the NFC circuit.

27. An apparatus comprising:
a power supply circuit operative to:
generate a supply voltage from an antenna voltage received from an NFC (Near Field Communication) antenna, the antenna voltage powering an NFC circuit coupled to the NFC antenna;
via the supply voltage, providing an output current to a load, the load being independent of the NFC circuit;
control the output current provided by the supply voltage to the load depending on a difference between a magnitude of the supply voltage and a magnitude of a reference voltage; and
wherein the NFC circuit includes a controller operative to control the magnitude of the reference voltage.

28. The apparatus as in claim 27, wherein the magnitude of the reference voltage represents a DC voltage needed to power the NFC circuit.

* * * * *